(12) United States Patent
Tachigi (10) Patent No.: US 8,570,219 B2
(45) Date of Patent: Oct. 29, 2013

(54) METHOD AND APPARATUS FOR DETECTING POSITION

(75) Inventor: Kazuomi Tachigi, Tokyo-to (JP)

(73) Assignee: Kabushiki Kaisha Kenwood, Tokyo (JP)

( * ) Notice: Subject to any disclaimer, the term of this patent is extended or adjusted under 35 U.S.C. 154(b) by 216 days.

(21) Appl. No.: 13/067,563

(22) Filed: Jun. 9, 2011

(65) Prior Publication Data

US 2012/0001800 A1 Jan. 5, 2012

(30) Foreign Application Priority Data

Jun. 30, 2010 (JP) ................................. 2010-148689

(51) Int. Cl.
*G01S 19/34* (2010.01)

(52) U.S. Cl.
USPC .................................................... 342/357.74

(58) Field of Classification Search
USPC .................................................... 342/357.74
See application file for complete search history.

(56) References Cited

U.S. PATENT DOCUMENTS

| 2007/0152878 | A1* | 7/2007 | Wang et al. | ............... | 342/357.06 |
| 2008/0117103 | A1* | 5/2008 | Wang et al. | ............... | 342/357.13 |
| 2008/0150797 | A1* | 6/2008 | Jia et al. | ................... | 342/357.06 |

FOREIGN PATENT DOCUMENTS

| CN | 101598568 | 12/2009 |
| JP | 03-141728 | 6/1991 |
| JP | 10-020014 | 1/1998 |
| JP | 11-295410 | 10/1999 |
| JP | 2001-074494 | 3/2001 |

\* cited by examiner

*Primary Examiner* — Harry Liu
(74) *Attorney, Agent, or Firm* — Louis Woo (57) ABSTRACT

A position detecting apparatus includes a GPS receiver configured to catch one or more of GPS satellites and track one or more of the satellites while receiving a GPS signal or GPS signals from one or more of the satellites. A power supply controllably feeds power to the GPS receiver. A suspension time decider decides a suspension time in accordance with at least one of (1) the number of satellites caught by the GPS receiver and (2) the level of at least one of the received GPS signals, and determines whether or not the lapse of time during which the GPS receiver continues to track no satellite reaches a prescribed time. A suspension controller controls the power supply to suspend the power feed to the GPS receiver during a term equal in length to the decided suspension time in cases where the lapse of time reaches the prescribed time.

3 Claims, 9 Drawing Sheets

METHOD AND APPARATUS FOR DETECTING POSITION

BACKGROUND OF THE INVENTION

1. Field of the Invention

This invention relates to a method and an apparatus for detecting a position through the use of GPS (Global Positioning System) satellites.

2. Description of the Related Art

A GPS-based position detecting apparatus includes a GPS receiver for receiving GPS signals from at least three GPS satellites moving around the earth. The GPS receiver derives positing information from the received GPS signals. When information effective for positioning can be derived from the received GPS signals, that is, when the GPS satellites from which the received GPS signals come are worth tracking, the GPS receiver analyzes the received GPS signals in detail and computes the absolute position (the latitude and the longitude) of the apparatus in a plane on the earth from the results of the analyzation.

In the event that the GPS-based position detecting apparatus is in an underground place or shaded from GPS satellites by a building, GPS signals do not reach the GPS receiver in the apparatus. In this case, the GPS receiver neither tracks at least three GPS satellites nor measures the position of the apparatus. Even in such a case, the GPS receiver is continuously supplied with power to prepare for future normal conditions where the GPS receiver can track at least three GPS satellites. Accordingly, power is wastefully consumed by the GPS receiver.

Japanese patent application publication number 10-020014 discloses a GPS-based position detecting apparatus designed for power economy. In the apparatus of Japanese publication 10-020014, power supply to a GPS receiver is periodically turned on. The GPS receiver implements positioning when the power supply thereto is turned on. In the event that the GPS receiver fails to complete positioning within a prescribed time interval, the power supply thereto is forcedly interrupted. During the forced interruption of the power supply, the GPS receiver does not implement positioning even when normal conditions are restored where the GPS receiver can track at least three GPS satellites.

SUMMARY OF THE INVENTION

It is a first object of this invention to provide a power-saving apparatus for properly detecting a position through the use of GPS satellites.

It is a second object of this invention to provide a power-saving method of properly detecting a position through the use of GPS satellites.

A first aspect of this invention provides a position detecting apparatus comprising a GPS receiver configured to catch one or more of GPS satellites and track one or more of the GPS satellites while receiving a GPS signal or GPS signals from one or more of the GPS satellites, and implement positioning on the basis of received GPS signals from tracked GPS satellites; a GPS power supply configured to controllably feed power to the GPS receiver; a suspension time decider configured to decide a suspension time in accordance with at least one of (1) the number of GPS satellites caught by the GPS receiver and (2) the level of at least one of the received GPS signals, and determine whether or not the lapse of time during which the GPS receiver continues to track no GPS satellite reaches a prescribed time; and a suspension controller configured to control the GPS power supply to suspend the power feed to the GPS receiver during a term equal in length to the suspension time decided by the suspension time decider in cases where the suspension time decider determines that the lapse of time reaches the prescribed time.

A second aspect of this invention is based on the first aspect thereof, and provides a position detecting apparatus wherein the suspension time decider decreases the suspension time as an average value of the number of GPS satellites caught by the GPS receiver increases.

A third aspect of this invention is based on the first aspect thereof, and provides a position detecting apparatus wherein the suspension time decider decreases the suspension time as a peak value of the level of at least one of the received GPS signals increases.

A fourth aspect of this invention provides a position detecting apparatus comprising a GPS receiver configured to catch one or more of GPS satellites and track one or more of the GPS satellites while receiving a GPS signal or GPS signals from one or more of the GPS satellites, and implement positioning on the basis of received GPS signals from tracked GPS satellites; a GPS power supply configured to controllably feed power to the GPS receiver; a suspension time decider configured to repetitively determine whether or not the lapse of time during which the GPS receiver continues to track no GPS satellite reaches a prescribed time, count successive determinations that the lapse of time reaches the prescribed time, and decide a suspension time in accordance with the number of the counted successive determinations such that the decided suspension time increases as the number of the counted successive determinations increases; and a suspension controller configured to control the GPS power supply to suspend the power feed to the GPS receiver during a term equal in length to the suspension time decided by the suspension time decider in cases where the suspension time decider determines that the lapse of time reaches the first prescribed time.

A fifth aspect of this invention is based on the first aspect thereof, and provides a position detecting apparatus further comprising a radio communication section including a reception circuit and configured to implement radio communications with an external apparatus, and a radio controller configured to switch the reception circuit between an on state and an off state, wherein the suspension time decider is configured to decide whether or not the GPS receiver is in conditions where the GPS receiver can implement positioning on the basis of received GPS signals, and the suspension controller is configured to control the GPS power supply to suspend the power feed to the GPS receiver while the radio controller holds the reception circuit in the on state in cases where the suspension time decider decides that the GPS receiver is in the conditions where the GPS receiver can implement positioning.

A sixth aspect of this invention provides a method of detecting a position through the use of a position detecting apparatus including a GPS receiver and a GPS power supply. The GPS receiver is configured to catch one or more of GPS satellites and track one or more of the GPS satellites while receiving a GPS signal or GPS signals from one or more of the GPS satellites, and implement positioning on the basis of received GPS signals from tracked GPS satellites. The GPS power supply is configured to controllably feed power to the GPS receiver. The method comprises the steps of deciding a suspension time in accordance with at least one of (1) the number of GPS satellites caught by the GPS receiver and (2) the level of at least one of the received GPS signals; determining whether or not the lapse of time during which the GPS receiver continues to track no GPS satellite reaches a prescribed time; and controlling the GPS power supply to suspend the power feed to the GPS receiver during a term equal in length to the decided suspension time in cases where it is determined that the lapse of time reaches the prescribed time.

A seventh aspect of this invention is based on the sixth aspect thereof, and provides a method wherein the decided suspension time is decreased as an average value of the number of GPS satellites caught by the GPS receiver increases.

An eighth aspect of this invention is based on the sixth aspect thereof, and provides a method wherein the decided suspension time decider is decreased as a peak value of the level of at least one of the received GPS signals increases.

A ninth aspect of this invention is based on the fourth aspect thereof, and provides a position detecting apparatus further comprising a radio communication section including a reception circuit and configured to implement radio communications with an external apparatus, and a radio controller configured to switch the reception circuit between an on state and an off state, wherein the suspension time decider is configured to decide whether or not the GPS receiver is in conditions where the GPS receiver can implement positioning on the basis of received GPS signals, and the suspension controller is configured to control the GPS power supply to suspend the power feed to the GPS receiver while the radio controller holds the reception circuit in the on state in cases where the suspension time decider decides that the GPS receiver is in the conditions where the GPS receiver can implement positioning.

This invention is advantageous in that a GPS receiver properly implements positioning while power consumed by the GPS receiver is efficiently suppressed.

DETAILED DESCRIPTION OF THE INVENTION

First Embodiment

Figure 1:
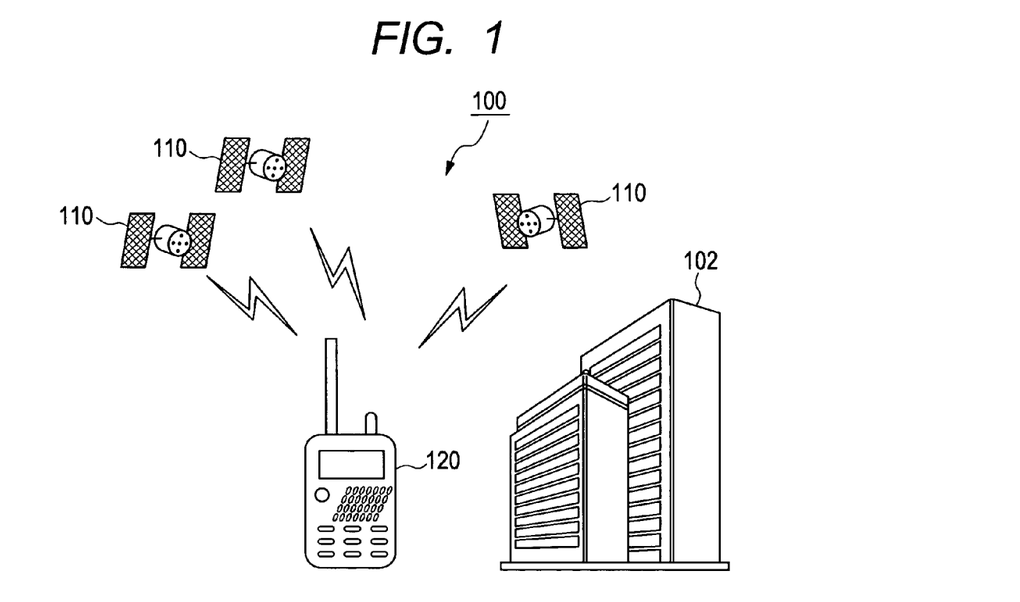
FIG. 1 is a diagram of a position detecting system including a plurality of GPS satellites and a position detecting apparatus according to a first embodiment of this invention.

With reference to FIG. 1, a position detecting system 100 includes a plurality of GPS satellites 110 and a position detecting apparatus 120 according to a first embodiment of this invention.

Each GPS satellite 110 contains an atomic clock for measuring the time through the use of an atomic or molecular spectral line. The GPS satellite 110 generates a GPS signal having information representative of the time measured by the atomic clock and the position (the in-orbit position) of the satellite 110, and transmits the GPS signal via frequency bands of 1.2/1.5 GHz. The time represented by the information in the GPS signal means the time of transmission of the GPS signal from the satellite 110.

The position detecting apparatus 120 can receive GPS signals from GPS satellites 110 in view. The case where the position detecting apparatus 120 satisfactorily derives information effective for positioning (position measurement) from received GPS signals is referred to as the case where the position detecting apparatus 120 is tracking GPS satellites 110 from which the received GPS signals come. When the position detecting apparatus 120 satisfactorily derives effective information from at least three received GPS signals, that is, when the position detecting apparatus 120 is tracking at least three GPS satellites 110, the apparatus 120 analyzes the effective information and computes the absolute position of the apparatus 120 from the results of the analyzation. The position detecting apparatus 120 repetitively implements the above-mentioned positioning (position measurement).

For example, in the case where the position detecting apparatus 120 is tracking three GPS satellites 110, the apparatus 120 computes the latitude and the longitude of the apparatus 120 in a plane on the earth. This positioning is referred to as the 2D (two-dimensional) positioning or position measurement. For example, in the case where the position detecting apparatus 120 is tracking four GPS satellites 110, the apparatus 120 computes the latitude, the longitude, and the altitude of the apparatus 120 with respect to the earth. This positioning is referred to as the 3D (three-dimensional) positioning or position measurement.

The case where the position detecting apparatus 120 can not derive effective information from received GPS signals but the apparatus 120 recognizes from the received GPS signals the existence of related GPS satellites 110 is referred to as the case where the apparatus 120 is catching the GPS satellites 110. Specifically, the case where the position detecting apparatus 120 receives GPS signals with levels equal to or greater than a prescribed threshold value but effective positioning information can not be derived therefrom so that GPS satellites 110 from which the received GPS signals come are not worth tracking is referred to as the case where the apparatus 120 is catching the GPS satellites 110.

In the event that the position detecting apparatus 120 is in an underground place or shaded from GPS satellites 110 by a building 102, GPS signals from the GPS satellites 110 do not reach the apparatus 120 so that the apparatus 120 neither tracks at least three GPS satellites 110 nor measures the position of the apparatus 120. Preferably, even in such a case or in the case where the position detecting apparatus 120 is tracking no GPS satellite 110, a GPS receiver in the apparatus 120 is supplied with power to prepare for future normal conditions caused by movement of the apparatus 120 or environmental changes about the apparatus 120. The normal conditions mean conditions where the apparatus 120 is satisfactorily tracking at least three GPS satellites 110. It is preferable to efficiently reduce power consumed by the GPS receiver in this case since the position detecting apparatus 120 is battery-powered.

In the position detecting apparatus 120, power supply to the GPS receiver is on an intermittent basis. Time intervals for which power supply to the GPS receiver is performed and time intervals of suspension of power supply to the GPS receiver are designed so that the GPS receiver can properly implement positioning while power consumed by the GPS receiver can efficiently be suppressed.

Figure 2:
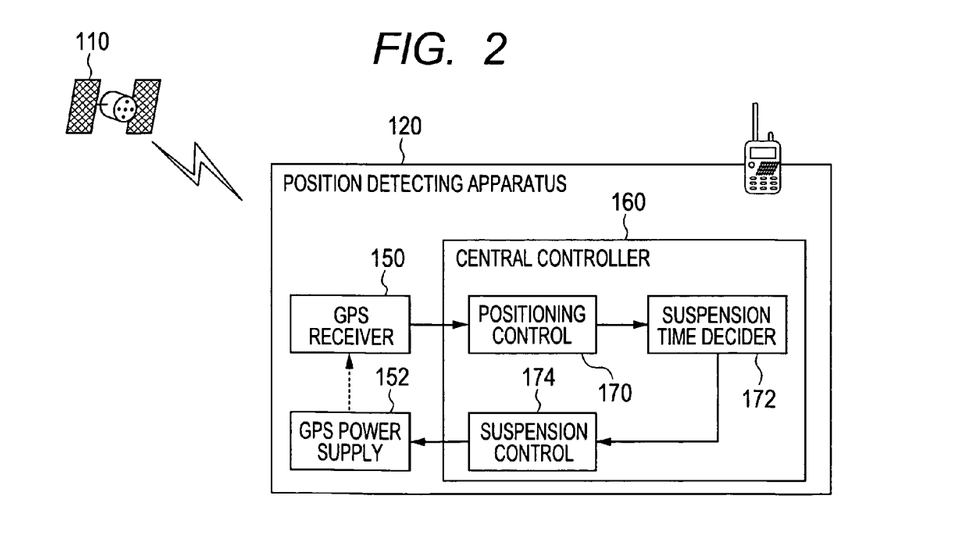
FIG. 2 is a diagram of a GPS satellite and the position detecting apparatus in FIG. 1.

As shown in FIG. 2, the position detecting apparatus 120 includes a GPS receiver 150, a GPS power supply 152, and a central controller 160. The GPS power supply 152 controllably feeds power to the GPS receiver 150. The central controller 160 serves to control the GPS power supply 152 or the connection of the GPS power supply 152 to the GPS receiver 150. The GPS receiver 150 repetitively implements positioning (position measurement) and notifies the results of positioning to the central controller 160.

The GPS receiver 150 serves to receive a GPS signal or signals from a GPS satellite or satellites 110. The GPS receiver 150 repetitively implements positioning on the basis of received GPS signals from GPS satellites 110 which are being tracked. Specifically, the GPS receiver 150 subjects received GPS signals from at least three tracked GPS satellites 110 to demodulation to detect the time of transmission of the GPS signal from each of the GPS satellites 110 and the position of each of the GPS satellites 110. The position detecting apparatus 120 has an internal clock referred to as an apparatus clock. The GPS receiver 150 detects the time of reception of each of the GPS signals by referring to the apparatus clock. The GPS receiver 150 computes the distance between the position detecting apparatus 120 and each of the GPS satellites 110 from the time of transmission of the related GPS signal, the time of reception thereof, and the velocity of propagation thereof. The GPS receiver 150 determines the position (the latitude, longitude, and altitude) of the apparatus 120 on the basis of the positions of the GPS satellites 110 and the computed distances between the apparatus 120 and the GPS satellites 110 according to trilateration. Furthermore, the GPS receiver 150 determines the direction and speed of travel of the apparatus 120 on the basis of the received GPS signals. In addition, the GPS receiver 150 decides whether or not positioning (position measurement) is successfully implemented, and generates caught-satellite information from the received GPS signals. The caught-satellite information has pieces indicating the ID numbers, elevation angles, and azimuth angles of caught GPS satellites 110, pieces indicating the signal-to-noise ratios (SNRs) regarding the received GPS signals, and pieces indicating whether or not the caught GPS satellites 110 are tracked.

The GPS receiver 150 generates NMEA (National Marine Electronics Association) data representing the determined latitude, longitude, travel direction, travel speed, and altitude of the apparatus 120 and representing whether or not positioning is successfully implemented, and including caught-satellite information. The position detecting apparatus 120 contains a UART (Universal Asynchronous Receiver Transmitter). The GPS receiver 150 outputs the NMEA data to the central controller 160 through the UART. Preferably, the GPS receiver 150 can implement either 2D positioning or 3D positioning. When three GPS satellites 110 are being tracked by the apparatus 120, the GPS receiver 150 can implement 2D positioning. When four or more GPS satellites 110 are being tracked, the GPS receiver 150 can implement 3D positioning.

The position detecting apparatus 120 includes a secondary battery or a rechargeable battery. The GPS power supply 152 serves to controllably feed power from the battery to the GPS receiver 150. The GPS power supply 152 is controlled by the central controller 160 to selectively implement and suspend the power feed to the GPS receiver 150.

The central controller 160 has a combination of semiconductor integrated circuits including a CPU (central processing unit), a DSP (digital signal processor), a ROM storing a control program and others, a RAM providing a work area, and other memories. The central controller 160 is designed to manage and control the whole of the position detecting apparatus 120.

The central controller 160 may include a computer system having a combination of an input/output port, a processor, a ROM, and a RAM. In this case, the central controller 160 operates in accordance with a control program (a computer program) stored in the ROM. The control program enables the central controller 160 to perform operation steps and actions mentioned later.

The control program allows the central controller 160 to serve as a positioning controller 170, a suspension time decider 172, and a suspension controller 174. The control program enables the positioning controller 170, the suspension time decider 172, and the suspension controller 174 to perform operation steps and actions mentioned hereafter.

The positioning controller 170 receives the NMEA data from the GPS receiver 150. The NMEA data is in a serial form. The positioning controller 170 derives GPS information from the received NMEA data. The GPS information has pieces indicating the latitude, longitude, travel direction, travel speed, and altitude of the apparatus 120, and a piece representing whether or not positioning is successfully implemented. The GPS information contains caught-satellite information having pieces indicating the ID numbers, elevation angles, and azimuth angles of caught GPS satellites 110, pieces indicating the signal-to-noise ratios (SNRs) regarding the received GPS signals, and pieces indicating whether or not the caught GPS satellites 110 are tracked. The positioning controller 170 feeds the GPS information to the suspension time decider 172. Thus, the positioning controller 170 notifies the suspension time decider 172 of the number of GPS satellites 110 caught by the GPS receiver 150 and the SNRs regarding the received GPS signals.

The suspension time decider 172 calculates or decides a desired suspension time interval on the basis of the number of caught GPS satellites 110 or at least one of the SNRs regarding the received GPS signals. The suspension time decider 172 notifies the suspension controller 174 of the desired suspension time interval.

The suspension time decider 172 measures a time interval for which the GPS receiver 150 remains tracking no GPS satellite 110 and hence information effective for positioning continues to be derived from none of received GPS signals. The suspension time decider 172 determines whether or not the measured time interval reaches a first prescribed time interval. The suspension time decider 172 notifies the suspension controller 174 of the result of this determination. The suspension controller 174 responds to the result of the determination. In the case where the measured time interval reaches the first prescribed time interval, the suspension controller 174 controls the GPS power supply 152 to suspend the power feed to the GPS receiver 150 for a term equal in length to the desired suspension time interval notified by the suspension time decider 172.

Detailed operation of the suspension time decider 172 and the suspension controller 174 is as follows. The suspension time decider 172 accesses the pieces of the GPS information from the positioning controller 170 which indicate whether or not caught GPS satellites 110 are tracked. By referring to the accessed GPS information pieces, the suspension time decider 172 determines whether or not at least one GPS satellite 110 is tracked. When no GPS satellite 110 is tracked, the suspension time decider 172 start repetitively counting GPS satellites 110 caught by the GPS receiver 150 by referring to caught-satellite information in the GPS information. Specifically, at prescribed intervals (for example, intervals of 10 seconds), the suspension time decider 172 detects the number of GPS satellites 110 caught by the GPS receiver 150 by referring to the caught-satellite information. The suspension time decider 172 adds or integrates the detected caught-satellite numbers.

Preferably, the first prescribed time interval is set to a time interval normally taken by the GPS receiver 150 to newly track a GPS satellite 110 or a time interval taken to complete a decision as to whether no GPS satellite 110 can be tracked. The first prescribed time interval is equal to, for example, 5 minutes. The suspension time decider 172 measures a term during which no GPS satellite 110 is tracked. Until the measured term reaches the first prescribed time interval, the suspension time decider 172 repetitively decides whether or not at least one GPS satellite 110 is tracked. In the case where no GPS satellite 110 is tracked until the measured term reaches the first prescribed time interval, the suspension time decider 172 quits detecting the number of caught GPS satellites 110 when the measured term reaches the first prescribed time interval. At this time, the suspension time decider 172 divides the result of addition (integration) of the detected caught-satellite numbers by the number of times of detection of the caught-satellite number to calculate the average caught-satellite number. The suspension time decider 172 sets the desired suspension time interval in accordance with the calculated average caught-satellite number. Specifically, the desired suspension time interval decreases as the average caught-satellite number increases.

In the case where the average caught-satellite number is relatively small, the GPS receiver 150 has a little chance to track one or more GPS satellites 110 thereafter. On the other hand, in the case where the average caught-satellite number is relatively large, the GPS receiver 150 has a good chance to track one or more GPS satellites 110 thereafter.

Accordingly, the suspension time decider 172 sets the desired suspension time interval relatively long in the case where the average caught-satellite number is relatively small so that the GPS receiver 150 has a little chance to track at least one GPS satellite 110. The suspension time decider 172 sets the desired suspension time interval relatively short in the case where the average caught-satellite number is relatively large so that the GPS receiver 150 has a good chance to track at least one GPS satellite 110. For example, the suspension time decider 172 sets the desired suspension time interval to 1 minute when the average caught-satellite number is equal to or greater than 3. The suspension time decider 172 sets the desired suspension time interval to 2 minutes when the average caught-satellite number is equal to or greater than 2 but less than 3. The suspension time decider 172 sets the desired suspension time interval to 4 minutes when the average caught-satellite number is equal to or greater than 1 but less than 2. The suspension time decider 172 sets the desired suspension time interval to 8 minutes when the average caught-satellite number is less than 1.

Figure 3:
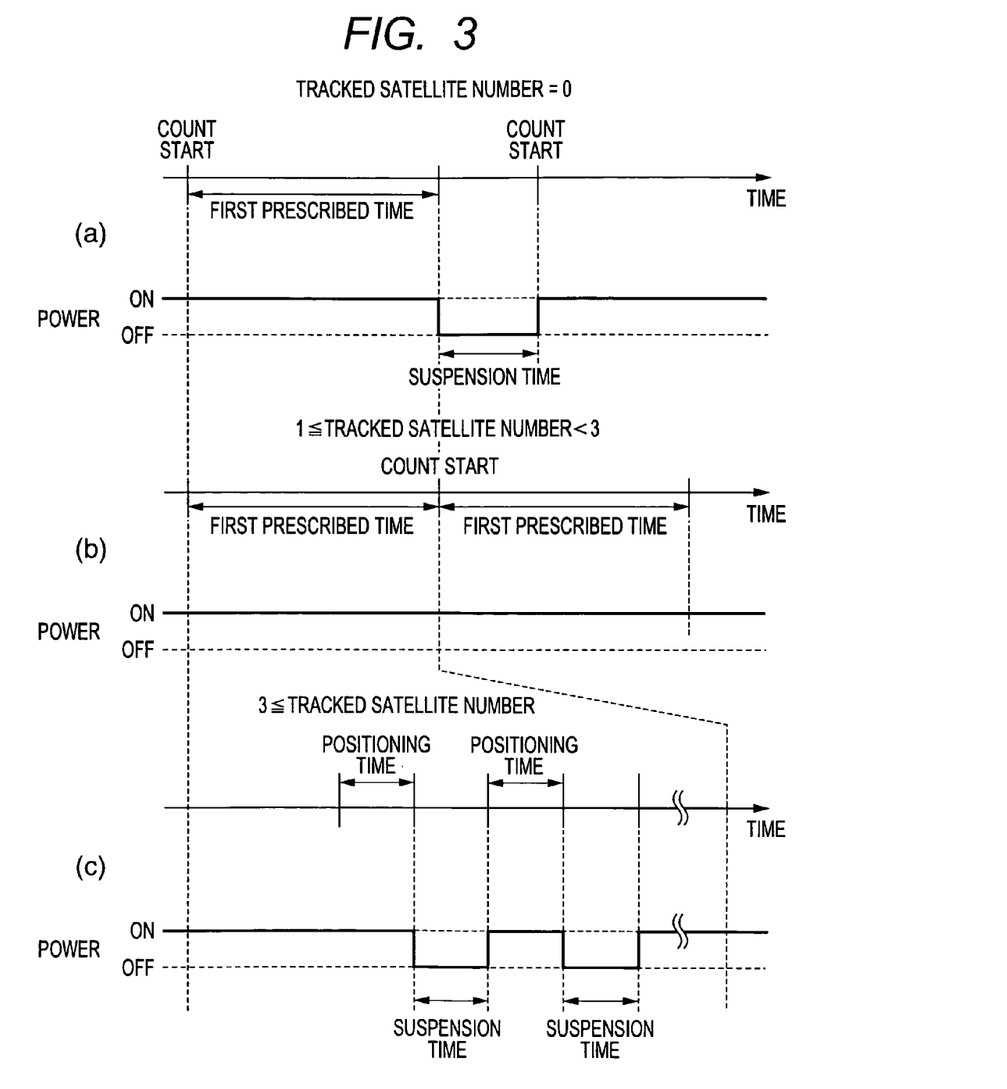
FIG. 3 is a time-domain diagram showing changes in the state of power feed to a GPS receiver in the position detecting apparatus of FIG. 2.

As shown in FIG. 3(a), in the event that the measured time interval for which the GPS receiver 150 remains tracking no GPS satellite 110 reaches the first prescribed time interval, the suspension controller 174 controls the GPS power supply 152 to suspend the power feed to the GPS receiver 150 for a term equal in length to the desired suspension time interval notified by the suspension time decider 172. The desired suspension time interval decreases as the average number of caught GPS satellites 110 increases, that is, as the GPS receiver 150 has a better chance to track at least one GPS satellite 110. Thus, the term for which the power feed to the GPS receiver 150 continues to be suspended decreases as the average number of caught GPS satellites 110 increases, that is, as the GPS receiver 150 has a better chance to track at least one GPS satellite 110. A decrease in the term of suspension of the power feed to the GPS receiver 150 allows the GPS receiver 150 to more frequently try tracking at least one GPS satellite 110. The term of suspension of the power feed to the GPS receiver 150 increases as the average number of caught GPS satellites 110 decreases, that is, as the GPS receiver 150 has a less chance to track at least one GPS satellite 110. An increase in the term of suspension of the power feed to the GPS receiver 150 causes a reduction of power consumed by the GPS receiver 150.

The suspension time decider 172 may be modified to implement the following operation steps. When no GPS satellite 110 is tracked, the suspension time decider 172 does not start counting caught GPS satellites 110 immediately. The suspension time decider 172 detects the moment of the beginning of conditions where no GPS satellite 110 is tracked. The suspension time decider 172 measures the lapse of time from the detected moment, and decides whether or not the measured lapse of time reaches a second prescribed time interval shorter than the first prescribed time interval. For example, the second prescribed time interval is equal to 4 minutes and 40 seconds when the first prescribed time interval is equal to 5 minutes. When the measured lapse of time reaches the second prescribed time interval, the suspension time decider 172 starts repetitively counting caught GPS satellites 110. Preferably, the suspension time decider 172 detects the number of caught GPS satellites 110 at intervals of 20 seconds.

The suspension time decider 172 may be modified to implement the following operation steps. The suspension time decider 172 calculates the average number of caught GPS satellites 110 for a latest time interval having a predetermined length. The suspension time decider 172 sets the desired suspension time interval in accordance with the calculated average caught-satellite number. Thus, even in the case where the position detecting apparatus 120 moves at a high speed so that conditions of the apparatus 120 relative to GPS satellites 110 rapidly change, the desired suspension time interval can be more harmonized with expected conditions of the apparatus 120 relative to GPS satellites 110. Preferably, the suspension time decider 172 detects the number of caught GPS satellites 110 at intervals of shorter than 10 seconds (for example, intervals of 2 seconds).

As previously mentioned, the desired suspension time interval is set in accordance with the average caught-satellite number. Therefore, an instantaneous increase or decrease in the number of caught GPS satellites 110 can be excluded from deciding the desired suspension time interval. Accordingly, it is possible to improve the accuracy of a prediction as to whether or not the GPS receiver 150 will track at least three GPS satellites 110, that is, whether or not the GPS receiver 150 will satisfactorily implement positioning.

The suspension time decider 172 may be modified to implement the following operation steps. The suspension time decider 172 determines whether or not the detected number of caught GPS satellites 110 tends to increase while no GPS satellite 110 remains tracked. In the case where the detected number of caught GPS satellites 110 tends to increase, the suspension time decider 172 sets the desired suspension time interval shorter than usual.

The suspension time decider 172 may be modified to implement the following operation steps. The suspension time decider 172 detects the instantaneous peak level (SNR) of at least one of received GPS signals from caught GPS satellites 110 by referring to the caught-satellite information in the GPS information during the term equal in length to the first prescribed time interval for which no GPS satellite 110 remains tracked (that is, the term equal in length to the first prescribed time interval and starting from the moment of the beginning of tracking no GPS satellite 110). The instantaneous peak level means the maximum of the varying level (SNR) taken by a received GPS signal during the above-mentioned term. The suspension time decider 172 decreases the desired suspension time interval as the detected peak level increases. For example, the suspension time decider 172 sets the desired suspension time interval to 1 minute when the detected peak level is equal to or higher than 20 dB/Hz. The suspension time decider 172 sets the desired suspension time interval to 2 minutes when the detected peak level is equal to or higher than 15 dB/Hz but lower than 20 dB/Hz. The suspension time decider 172 sets the desired suspension time interval to 4 minutes when the detected peak level is equal to or higher than 10 dB/Hz but lower than 15 dB/Hz. The suspension time decider 172 sets the desired suspension time interval to 8 minutes when the detected peak level is lower than 10 dB/Hz.

As the detected peak level is higher, the GPS receiver 150 has a better chance to track at least one GPS satellite 110. Accordingly, the suspension time decider 172 decreases the desired suspension time interval as the detected peak level increases, that is, as the GPS receiver 150 has a better chance to track at least one GPS satellite 110. Thus, the term for which the power feed to the GPS receiver 150 continues to be suspended decreases as the detected peak level increases, that is, as the GPS receiver 150 has a better chance to track at least one GPS satellite 110. A decrease in the term of suspension of the power feed to the GPS receiver 150 allows the GPS receiver 150 to more frequently try tracking at least one GPS satellite 110. The term of suspension of the power feed to the GPS receiver 150 increases as the detected peak level decreases, that is, as the GPS receiver 150 has a less chance to track at least one GPS satellite 110. An increase in the term of suspension of the power feed to the GPS receiver 150 causes a reduction of power consumed by the GPS receiver 150.

In the case where the suspension time decider 172 determines that one or two GPS satellites 110 are tracked before the time interval for which the GPS receiver 150 remains tracking no GPS satellite 110 reaches the first prescribed time interval, the suspension time decider 172 sets the desired suspension time interval to "0" and restarts repetitively counting caught GPS satellites 110 and measuring the lapse of time. Thus, in this case, the suspension controller 174 controls the GPS power supply 152 to continuously maintain the power feed to the GPS receiver 150.

In the case where one or two GPS satellite begin to be tracked before the time interval for which the GPS receiver 150 continues to non-implement positioning reaches the first prescribed time interval, the GPS receiver 150 has a good chance to track at least three GPS satellites 110. Thus, in such a case, as shown in FIG. 3(b), the suspension time decider 172 sets the desired suspension time interval to "0" and thereby enables the suspension controller 174 to control the GPS power supply 152 to continuously maintain the power feed to the GPS receiver 150 as preparations for positioning.

In the case where the GPS receiver 150 begins tracking three or more GPS satellites 110 before the time interval for which the GPS receiver 150 remains tracking no GPS satellite 110 reaches the first prescribed time interval, the GPS receiver 150 implements positioning. In this case, the suspension time decider 172 computes the desired suspension time interval from the time interval of positioning according to a predetermined duty cycle. The suspension time decider 172 notifies the suspension controller 174 of the desired suspension time interval. As shown in FIG. 3(c), immediately after positioning terminates, the suspension controller 174 controls the GPS power supply 152 to suspend the power feed to the GPS receiver 150 for a term equal in length to the desired suspension time interval notified by the suspension time decider 172. When such conditions continue, positioning and power-feed suspension alternate as shown in FIG. 3(c). For example, the predetermined duty cycle is 1:1 (50%), and both the time interval of positioning and the time interval of suspension of power feed are equal to 10 seconds.

In the position detecting apparatus 120, the time interval of suspension of power feed to the GPS receiver 150 is controlled and adjusted as mentioned above. Thereby, the GPS receiver 150 properly implements positioning while power consumed by the GPS receiver 150 is efficiently suppressed.

Figure 4:
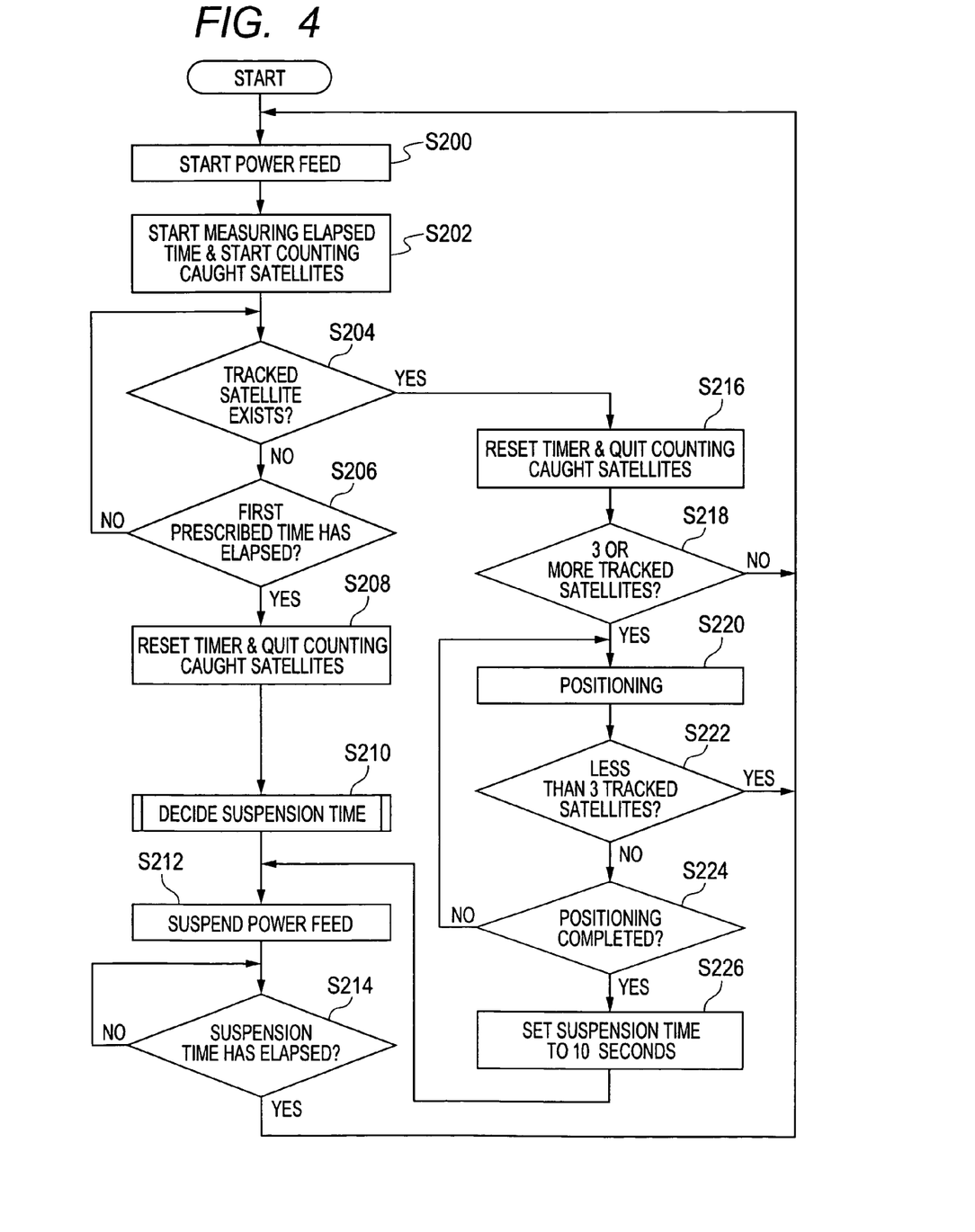
FIG. 4 is a flowchart of a segment of a control program for a central controller in the position detecting apparatus of FIG. 2.

FIG. 4 is a flowchart of a segment (subroutine) of the control program for the central controller 160 which relates to the suspension time decider 172 and the suspension controller 174.

As shown in FIG. 4, a first step S200 of the program segment controls the GPS power supply 152 to start or maintain the power feed to the GPS receiver 150.

A step S202 following the step S200 starts measuring the lapse of time through the use of a timer regarding the first prescribed time interval. In addition, the step S202 starts repetitively counting caught GPS satellites 110 on the basis of caught-satellite information in GPS information fed from the positioning controller 170. After the step S202, the program advances to a step S204.

The step S204 decides whether or not at least one GPS satellite 110 is tracked on the basis of the caught-satellite information. When at least one GPS satellite 110 is tracked, the program advances from the step S204 to a step S216. Otherwise, the program advances from the step S204 to a step S206.

The step S206 checks the timer and decides whether or not the measured lapse of time reaches the first prescribed time interval. When the measured lapse of time reaches the first prescribed time interval, the program advances from the step S206 to a step S208. Otherwise, the program returns from the step S206 to the step S204.

The step S208 resets the timer, and quits counting caught GPS satellites 110.

A block S210 following the step S208 decides a desired suspension time interval. After the block S210, the program advances to a step S212.

The step S216 resets the timer, and quits counting caught GPS satellites 110.

A step S218 subsequent to the step S216 decides whether or not at least three GPS satellites 110 are tracked on the basis of the caught-satellite information. When at least three GPS satellites 110 are tracked, the program advances from the step S218 to a step S220. Otherwise, the program returns from the step S218 to the step S200.

The step S220 recognizes that the GPS receiver 150 implements positioning.

A step S222 following the step S220 decides whether or not less than three GPS satellites 110 are tracked on the basis of the caught-satellite information. When less than three GPS satellites 110 are tracked, the program returns from the step S222 to the step S200. Otherwise, the program advances from the step S222 to a step S224.

The step S224 decides whether or not current positioning by the GPS receiver 150 has been completed on the basis of the GPS information. When current positioning has been completed, the program advances from the step S224 to a step S226. Otherwise, the program returns from the step S224 to the step S220.

The step S226 sets the desired suspension time interval to a predetermined time interval approximately equal in length to the term of positioning. The predetermined time interval is equal to, for example, 10 seconds. After the step S226, the program advances to the step S212.

The step S212 controls the GPS power supply 152 to suspend the power feed to the GPS receiver 150. After the step S212, the program advances to a step S214.

The step S214 measures a time interval for which the power feed to the GPS receiver 150 remains suspended. The step S214 determines whether or not the measured time interval reaches the desired suspension time interval given by the block S210 or the step S226. When the measured time interval reaches the desired suspension time interval, the program returns from the step S214 to the step S200 so that the power feed to the GPS receiver 150 will be restarted by the step S200. Otherwise, the step S214 is repeated. Thus, the power feed to the GPS receiver 150 remains suspended during a term equal in length to the desired suspension time interval.

In the case where the step S222 decides that less than three GPS satellites 110 are tracked, the program returns from the step S222 to the step S200 without passing through the step S212. Thus, in this case, the power feed to the GPS receiver 150 is maintained by action of the step S200 without being suspended by action of the step S212.

Figure 5:
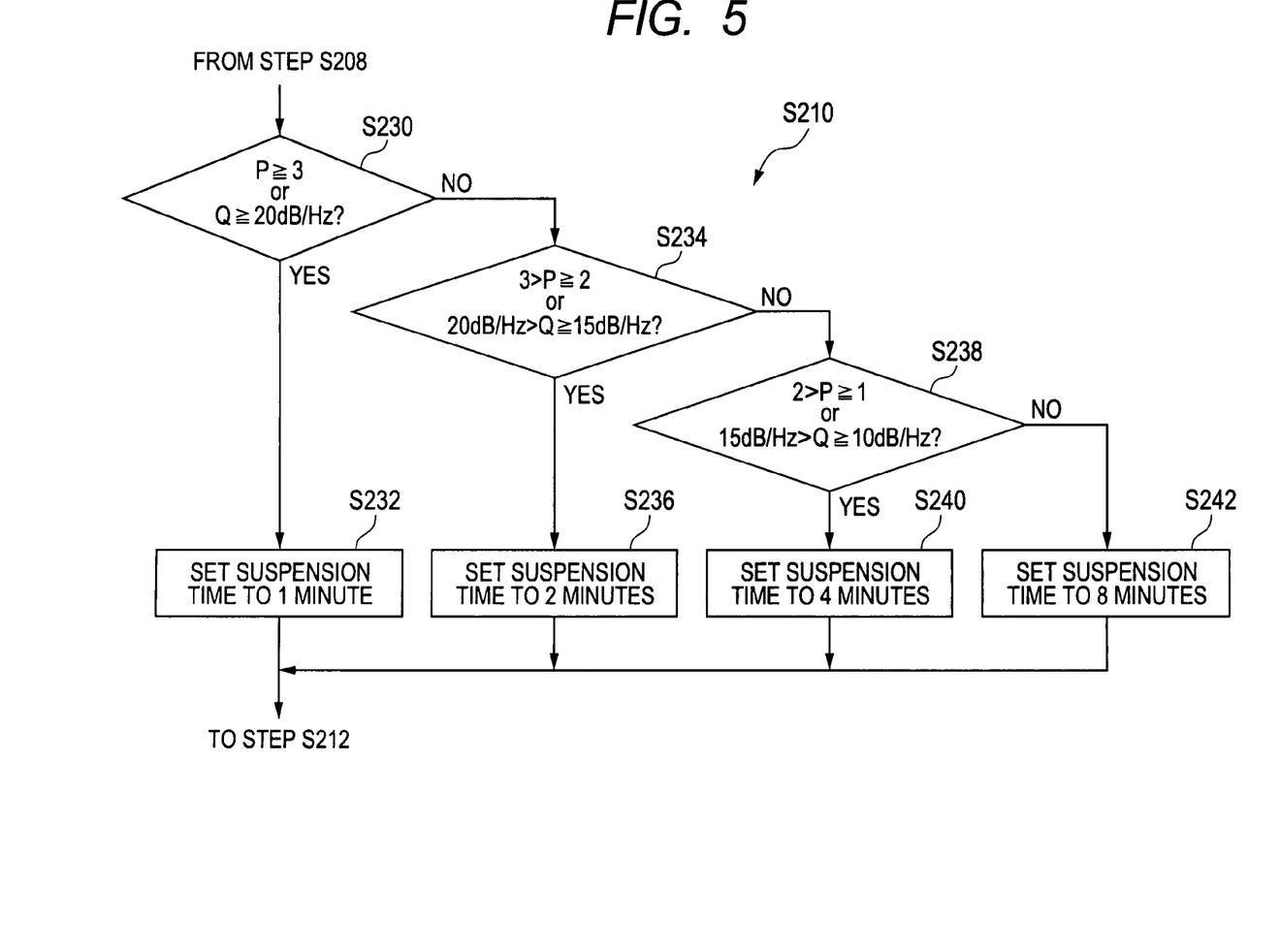
FIG. 5 is a flowchart showing the structure of a block in FIG. 4.

As shown in FIG. 5, the block S210 has steps S230-S242. The step S230 follows the step S208 and calculates the average number P of caught GPS satellites 110 from the results of repetitively counting them. The step S230 compares the average number P with 3. The step S230 detects the peak level Q of at least one of received GPS signals from caught GPS satellites 110 by referring to the caught-satellite information in the GPS information. The step S230 compares the peak level Q with a first preset value (equal to, for example, 20 dB/Hz). When the average number P is equal to or greater than 3, the program advances from the step S230 to the step S232. When the peak level Q is equal to or higher than the first preset value, the program advances from the step S230 to the step S232. In the other cases, the program advances from the step S230 to the step S234.

The step S232 sets the desired suspension time interval to 1 minute. After the step S232, the program advances to the step S212.

The step S234 compares the average number P with 2 and 3. The step S234 compares the peak level Q with the first preset value and a second preset value (equal to, for example, 15 dB/Hz) smaller than the first preset value. When the average number P is equal to or greater than 2 but smaller than 3, the program advances from the step S234 to the step S236. When the peak level Q is equal to or higher than the second preset value but lower than the first preset value, the program advances from the step S234 to the step S236. In the other cases, the program advances from the step S234 to the step S238.

The step S236 sets the desired suspension time interval to 2 minutes. After the step S236, the program advances to the step S212.

The step S238 compares the average number P with 1 and 2. The step S234 compares the peak level Q with the second preset value and a third preset value (equal to, for example, 10 dB/Hz) smaller than the second preset value. When the average number P is equal to or greater than 1 but smaller than 2, the program advances from the step S238 to the step S240. When the peak level Q is equal to or higher than the third preset value but lower than the second preset value, the program advances from the step S238 to the step S240. In the other cases, the program advances from the step S238 to the step S242.

The step S240 sets the desired suspension time interval to 4 minutes. After the step S240, the program advances to the step S212.

The step S242 sets the desired suspension time interval to 8 minutes. After the step S242, the program advances to the step S212.

A position detecting method carried out by the position detecting apparatus 120 is shown in FIG. 4. In the position detecting method, the time interval of suspension of power feed to the GPS receiver 150 is controlled and adjusted as mentioned above. Thereby, the GPS receiver 150 properly implements positioning while power consumed by the GPS receiver 150 is efficiently suppressed.

Second Embodiment

Figure 6:
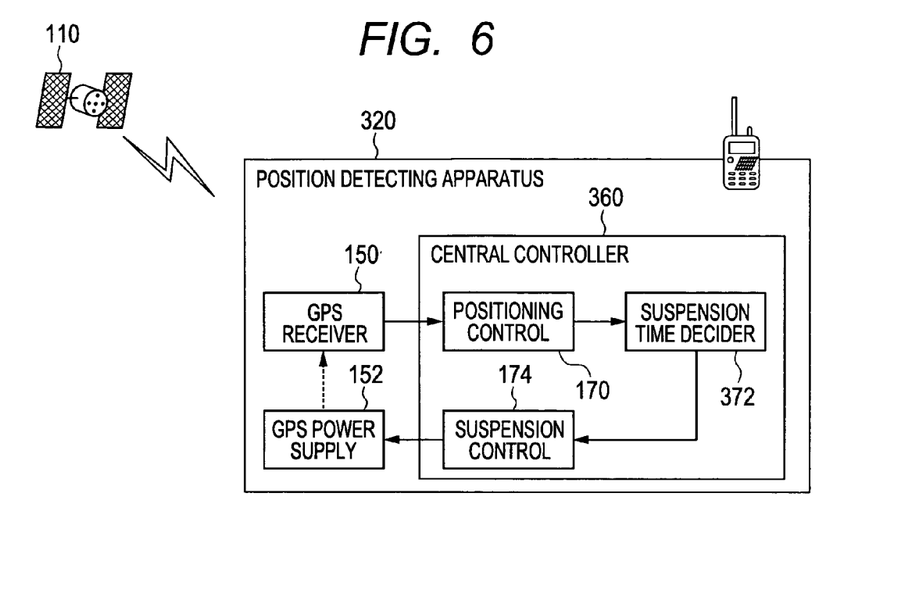
FIG. 6 is a diagram of a GPS satellite and a position detecting apparatus according to a second embodiment of this invention.

FIG. 6 shows a position detecting apparatus 320 according to a second embodiment of this invention. The position detecting apparatus 320 is similar to the position detecting apparatus 120 of FIG. 2 except for design changes mentioned hereafter.

The position detecting apparatus 320 includes a central controller 360 instead of the central controller 160 (see FIG. 2). The central controller 360 may be similar in hardware to the central controller 160. Preferably, a control program for the central controller 360 enables the central controller 360 to perform operation steps and actions mentioned hereafter.

The control program allows the central controller 360 to serve as the positioning controller 170, a suspension time decider 372, and the suspension controller 174. The suspension time decider 372 replaces the suspension time decider 172 (see FIG. 2). The control program enables the positioning controller 170, the suspension time decider 372, and the suspension controller 174 to perform operation steps and actions mentioned hereafter.

The suspension time decider 372 decides a desired suspension time interval such that the desired suspension time interval increases as conditions recur in which no GPS satellite 110 continues to be tracked for a term equal in length to the first prescribed time interval.

Figure 7:
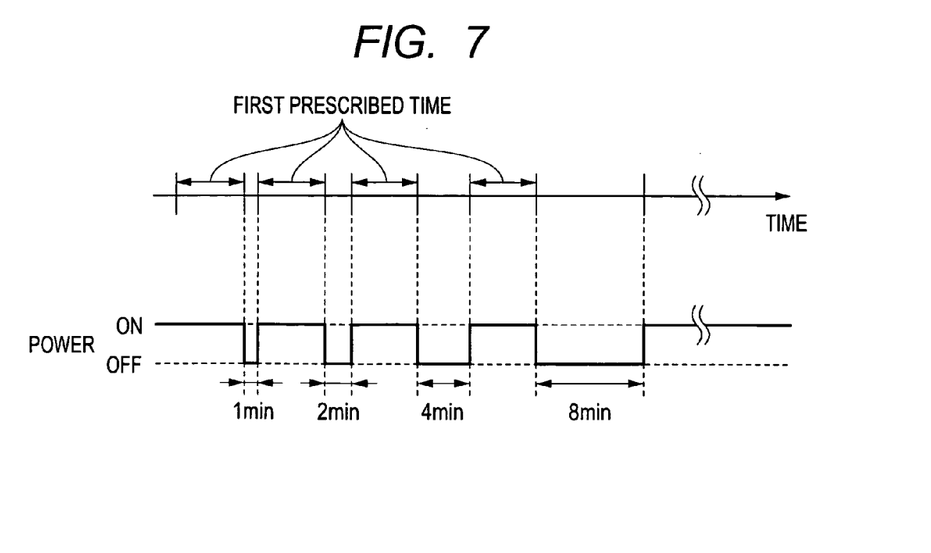
FIG. 7 is a time-domain diagram showing changes in the state of power feed to a GPS receiver in the position detecting apparatus of FIG. 6.

With reference to FIG. 7, in the case where no GPS satellite 110 continues to be tracked for a first term equal in length to the first prescribed time interval, the suspension time decider 372 sets the desired suspension time to 1 minute and controls the GPS power supply 152 through the suspension controller 174 to suspend the power feed to the GPS receiver 150 for 1 minute (the desired suspension time interval) starting from the moment of the end of the first term. In the case where no GPS satellite 110 continues to be tracked for a second term equal in length to the first prescribed time interval and starting from the moment of the end of the 1-minute power feed suspension, the suspension time decider 372 sets the desired suspension time to 2 minutes and controls the GPS power supply 152 through the suspension controller 174 to suspend the power feed to the GPS receiver 150 for 2 minutes (the desired suspension time interval) starting from the moment of the end of the second term. In the case where no GPS satellite 110 continues to be tracked for a third term equal in length to the first prescribed time interval and starting from the moment of the end of the 2-minute power feed suspension, the suspension time decider 372 sets the desired suspension time to 4 minutes and controls the GPS power supply 152 through the suspension controller 174 to suspend the power feed to the GPS receiver 150 for 4 minutes (the desired suspension time interval) starting from the moment of the end of the third term. In the case where no GPS satellite 110 continues to be tracked for a fourth term equal in length to the first prescribed time interval and starting from the moment of the end of the 4-minute power feed suspension, the suspension time decider 372 sets the desired suspension time to 8 minutes and controls the GPS power supply 152 through the suspension controller 174 to suspend the power feed to the GPS receiver 150 for 8 minutes (the desired suspension time interval) starting from the moment of the end of the fourth term. Thereafter, the suspension time decider 372 iterates such a process of setting the desired suspension time as long as no GPS satellite 110 continues to be tracked.

Generally, it is difficult to find out the cause of a reduction in the number of tracked GPS satellites 110 to zero. Accordingly, for the first-time occurrence of conditions where no GPS satellite 110 continues to be tracked during a term equal in length to the first prescribed time interval, the suspension time decider 372 sets the desired suspension time interval relatively short so that the GPS receiver 150 will have a good chance to track at least one GPS satellite 110. As such conditions recur, the suspension time decider 372 increases the desired suspension time interval so that power consumed by the GPS receiver 150 can be more reduced. Therefore, the position detecting apparatus 320 can properly perform positioning while achieving power economy.

Figure 8:
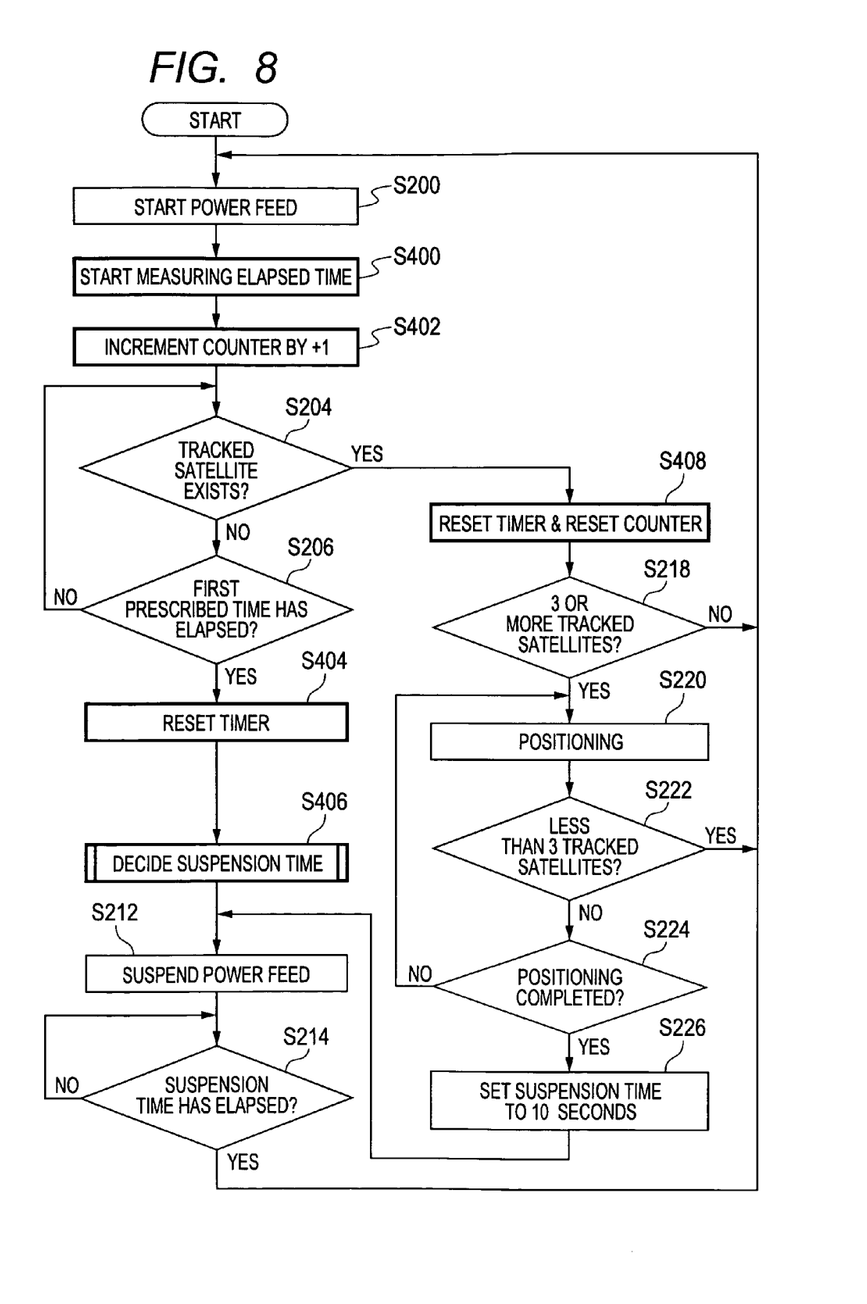
FIG. 8 is a flowchart of a segment of a control program for a central controller in the position detecting apparatus of FIG. 6.

FIG. 8 is a flowchart of a segment (subroutine) of the control program for the central controller 360 which relates to the suspension time decider 372 and the suspension controller 174.

As shown in FIG. 8, a first step S200 of the program segment controls the GPS power supply 152 to start or maintain the power feed to the GPS receiver 150.

A step S400 following the step S200 starts measuring the lapse of time through the use of a timer regarding the first prescribed time interval.

A step S402 increments a counter by 1. As will be made clear later, the counter indicates the number of times a term equal in length to the first prescribed time interval elapses after the GPS receiver 150 begins tracking no GPS satellite 110. After the step S402, the program advances to a step S204.

The step S204 decides whether or not at least one GPS satellite 110 is tracked. When at least one GPS satellite 110 is tracked, the program advances from the step S204 to a step S408. Otherwise, the program advances from the step S204 to a step S206.

The step S206 checks the timer and decides whether or not the measured lapse of time reaches the first prescribed time interval. When the measured lapse of time reaches the first prescribed time interval, the program advances from the step S206 to a step S404. Otherwise, the program returns from the step S206 to the step S204.

The step S404 resets the timer. After the step S404, the program advances to a block S406.

The block S406 decides a desired suspension time interval. After the block S406, the program advances to a step S212.

The step S408 resets the timer. Furthermore, the step S408 resets the counter to 0.

A step S218 subsequent to the step S408 decides whether or not at least three GPS satellites 110 are tracked. When at least three GPS satellites 110 are tracked, the program advances from the step S218 to a step S220. Otherwise, the program returns from the step S218 to the step S200.

The step S220 recognizes that the GPS receiver 150 implements positioning.

A step S222 following the step S220 decides whether or not less than three GPS satellites 110 are tracked. When less than three GPS satellites 110 are tracked, the program returns from the step S222 to the step S200. Otherwise, the program advances from the step S222 to a step S224.

The step S224 decides whether or not current positioning by the GPS receiver 150 has been completed. When current positioning has been completed, the program advances from the step S224 to a step S226. Otherwise, the program returns from the step S224 to the step S220.

The step S226 sets the desired suspension time interval to a predetermined time interval approximately equal in length to the term of positioning. The predetermined time interval is equal to, for example, 10 seconds. After the step S226, the program advances to the step S212.

The step S212 controls the GPS power supply 152 to suspend the power feed to the GPS receiver 150. After the step S212, the program advances to a step S214.

The step S214 measures a time interval for which the power feed to the GPS receiver 150 remains suspended. The step S214 determines whether or not the measured time interval reaches the desired suspension time interval given by the block S406 or the step S226. When the measured time interval reaches the desired suspension time interval, the program returns from the step S214 to the step S200 so that the power feed to the GPS receiver 150 will be restarted by action of the step S200. Otherwise, the step S214 is repeated.

Figure 9:
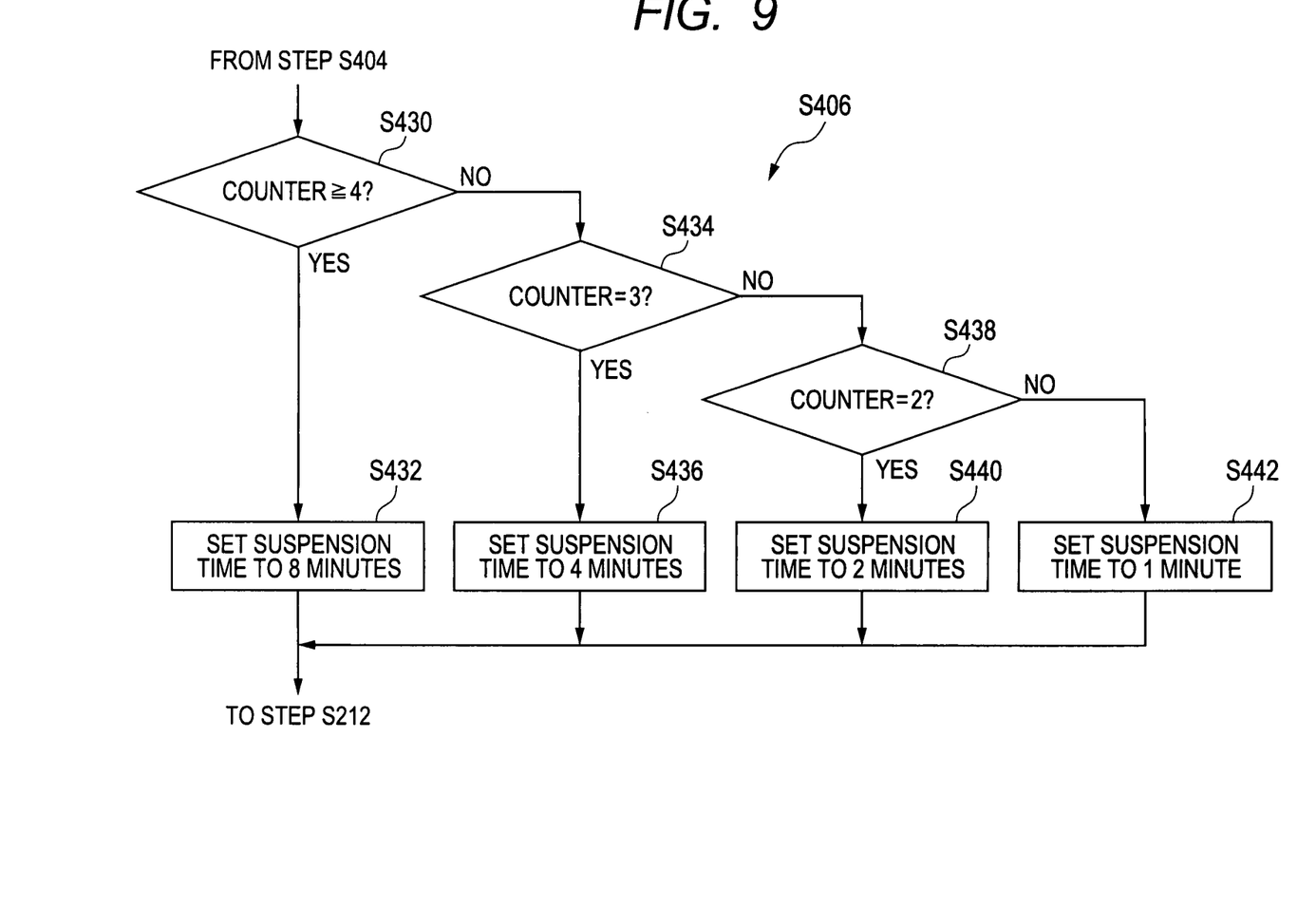
FIG. 9 is a flowchart showing the structure of a block in FIG. 4.

As shown in FIG. 9, the block S406 has steps S430-S442. The step S430 follows the step S404 and refers to the counter. The step S430 decides whether or not the counter is smaller than 4. When the counter is not smaller than 4, that is, when the counter is equal to or greater than 4, the program advances from the step S430 to the step S432. Otherwise, the program advances from the step S430 to the step S434.

The step S432 sets the desired suspension time interval to 8 minutes. After the step S432, the program advances to the step S212.

The step S434 decides whether or not the counter is equal to 3. When the counter is equal to 3, the program advances from the step S434 to the step S436. Otherwise, the program advances from the step. S434 to the step S438.

The step S436 sets the desired suspension time interval to 4 minutes. After the step S436, the program advances to the step S212.

The step S438 decides whether or not the counter is equal to 2. When the counter is equal to 2, the program advances from the step S438 to the step S440. Otherwise, the program advances from the step S438 to the step S442.

The step S440 sets the desired suspension time interval to 2 minutes. After the step S440, the program advances to the step S212.

The step S442 sets the desired suspension time interval to 1 minute. After the step S442, the program advances to the step S212.

In the position detecting apparatus 320, the time interval of suspension of power feed to the GPS receiver 150 is controlled and adjusted as mentioned above. Thereby, the GPS receiver 150 properly implements positioning while power consumed by the GPS receiver 150 is efficiently suppressed.

Third Embodiment

Figure 10:
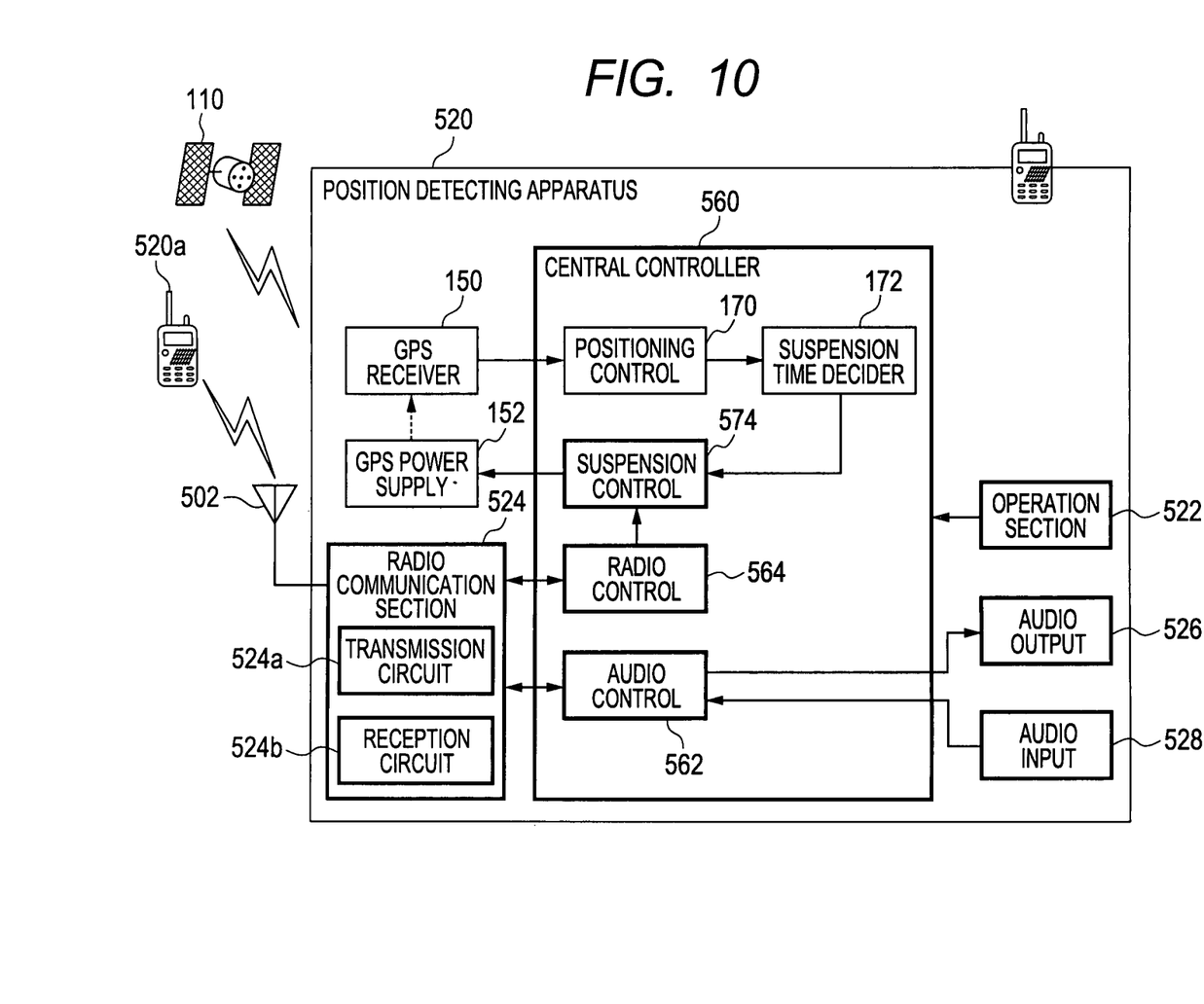
FIG. 10 is a diagram of a GPS satellite, a position detecting apparatus in a third embodiment of this invention, and another position detecting apparatus.

FIG. 10 shows a position detecting apparatus 520 according to a third embodiment of this invention. The position detecting apparatus 520 is similar to the position detecting apparatus 120 of FIG. 2 except for design changes mentioned hereafter.

As shown in FIG. 10, the position detecting apparatus 520 includes the GPS receiver 150, the GPS power supply 152, an operation section 522, a radio communication section 524, an audio output section 526, an audio input section 528, and a central controller 560. The position detecting apparatus 520 is provided with an antenna 502.

The central controller 560 replaces the central controller 160 (see FIG. 2). The central controller 560 may be similar in hardware to the central controller 160. Preferably, a control program for the central controller 560 enables the central controller 560 to perform operation steps and actions mentioned hereafter.

The control program allows the central controller 560 to serve as the positioning controller 170, the suspension time decider 172, an audio controller 562, a radio controller 564, and a suspension controller 574 which replaces the suspension controller 174 (see FIG. 2). The suspension time decider 172 may be replaced by the suspension time decider 372 (see FIG. 6).

Preferably, the position detecting apparatus 520 is at least part of an electronic apparatus such as a portable transceiver, a mobile phone, a PHS (Personal Handy-phone System), a PDA (Personal Digital Assistant), a smart phone, or a personal computer.

The operation section 522 includes operation keys and buttons, a directional pad (a cross key), and a joy stick which can be actuated by a user.

The radio communication section 524 has a transmission circuit 524a and a reception circuit 524b. The radio communication section 524 implements radio communications with another position detecting apparatus 520a via the antenna 502. The position detecting apparatus 520a may be the same in structure as the position detecting apparatus 520.

In the case where the user utters a voice toward the audio input section 528 while pushing a specified button in the operation section 522, the audio input section 528 converts the received sound into an electric audio signal. The audio input section 528 feeds the audio signal to the audio controller 562 in the central controller 560. The audio controller 562 passes the audio signal to the transmission circuit 524a in the radio communication section 524. The transmission circuit 524a encodes the audio signal into a signal of a prescribed code, and superimposes the prescribed-code signal on a carrier in a predetermined frequency band through modulation to get an RF signal to be transmitted. The transmission circuit 524a feeds the RF signal to the antenna 502. The RF signal is radiated and transmitted from the antenna 502, and propagates as a radio wave.

The other position detecting apparatus 520a receives the radio wave and subjects the received radio wave to demodulation to recover the audio signal. The position detecting apparatus 520a converts the recovered audio signal into corresponding sound being the voice of the user of the apparatus 520. Thus, the voice of the user of the apparatus 520 can be heard by the user of the apparatus 520a. In this way, the voice of the user of the apparatus 520 is transmitted to the user of the apparatus 520a.

The other position detecting apparatus 520a transmits a radio wave having a carrier in the predetermined frequency band on which information representative of a voice uttered by the user of the apparatus 520a is superimposed. The transmitted radio wave is received by the antenna 502. The received radio wave is fed from the antenna 502 to the reception circuit 524b. The reception circuit 524b subjects the received radio wave to demodulation to recover an audio signal representative of the voice of the user of the apparatus 520a. The reception circuit 524b feeds the audio signal to the audio controller 562 in the central controller 560. The audio controller 562 passes the audio signal to the audio output section 526. The audio output section 526 converts the audio signal into corresponding sound being the voice of the user of the apparatus 520a. Thus, the voice of the user of the apparatus 520a can be heard by the user of the apparatus 520. In this way, the voice of the user of the apparatus 520a is transmitted to the user of the apparatus 520.

The audio output section 526 includes, for example, a loudspeaker for converting an audio signal from the audio controller 562 into corresponding sound.

The audio input section 528 includes, for example, a microphone for converting user's voice into an electric audio signal and feeding the audio signal to the audio controller 562.

As explained above, the audio controller 562 passes an audio signal from the reception circuit 524b to the audio output section 526, and passes an audio signal from the audio input section 528 to the transmission circuit 524a.

The radio controller 564 turns on and off the transmission circuit 524a and the reception circuit 524b in the radio communication section 524 depending on communication conditions. The radio controller 564 responds to the state of the specified button in the operation section 522. When the specified button is pushed, the radio controller 564 turns on the transmission circuit 524a. When the specified button is released, the radio controller 564 turns off the transmission circuit 524a.

The radio controller 564 repetitively sets the reception circuit 524b in its on state for a third prescribed time interval (equal to, for example, 100 msec). The reception circuit 524b decides whether a received signal is present or absent when being in its on state. The reception circuit 524b notifies the result of this decision to the radio controller 564. In the absence of a received signal, the radio controller 564 sets and holds the reception circuit 524b in its off state for a fourth prescribed time interval (equal to, for example, about 5 seconds) thereafter. In the presence of a received signal, the radio controller 564 keeps the reception circuit 524b in its on state.

The radio controller 564 feeds the suspension controller 574 with information representing whether the radio controller 564 sets the reception circuit 524b in its on state or its off state. The suspension controller 574 responds to this information as will be made clear later.

In the case of conditions where the GPS receiver 150 can implement positioning on the basis of received GPS signals (that is, the GPS receiver 150 can track at least three GPS satellites 110), the suspension controller 574 controls the GPS power supply 152 to continuously suspend the power feed to the GPS receiver 150 while the radio controller 564 holds the reception circuit 524b in its on state. Specifically, in such conditions, the suspension controller 574 controls the GPS power supply 152 to suspend the power feed to the GPS receiver 150 when the reception circuit 524b is in its on state, and controls the GPS power supply 152 to enable the power feed and thereby allow the GPS receiver 150 to actually carry out positioning when the reception circuit 524b is in its off state.

Figure 11:
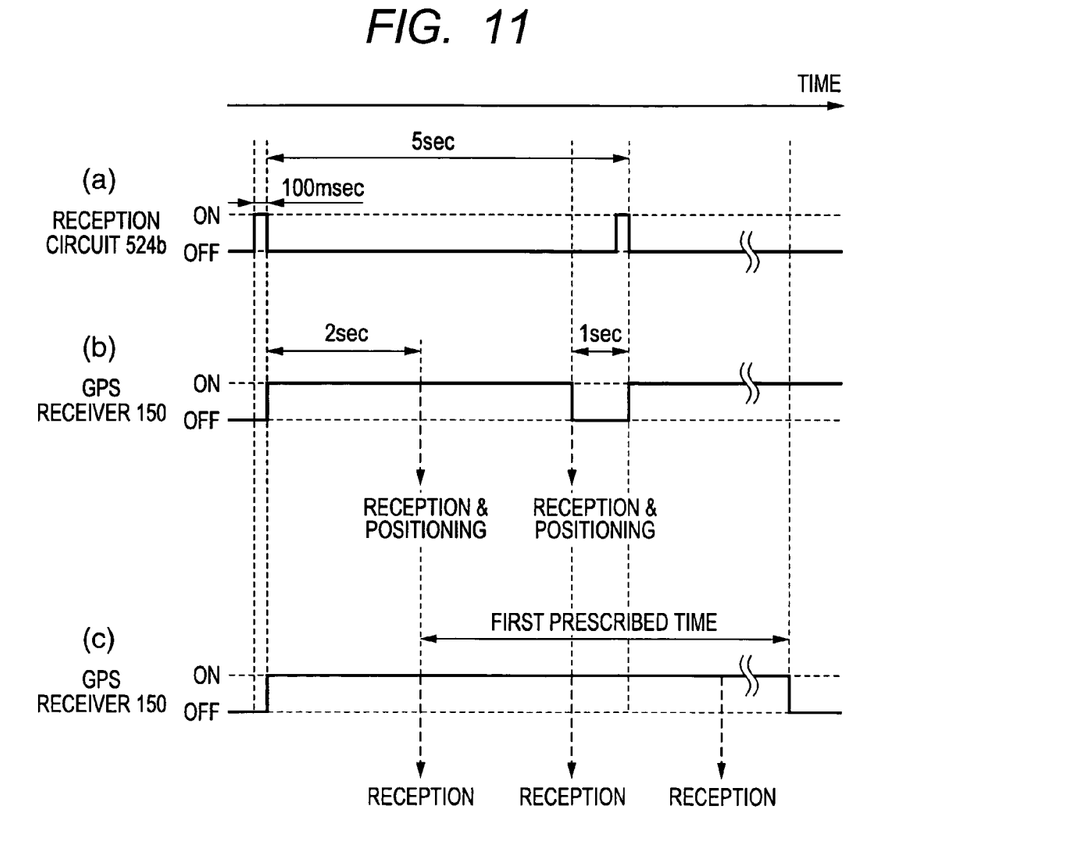
FIG. 11 is a time-domain diagram showing changes in the state of a reception circuit and changes in the state of a GPS receiver in the position detecting apparatus in the third embodiment of this invention.

With reference to FIG. 11, the radio controller 564 repetitively turns on the reception circuit 524b and then holds it in its on state for the third prescribed time interval (equal to, for example, 100 msec). While being held in its on state, the reception circuit 524b decides whether a received signal is present or absent. In the absence of a received signal, the radio controller 564 turns off the reception circuit 524 and then holds it in its off state for the fourth prescribed time interval (equal to, for example, about 5 seconds).

The suspension controller 574 decides whether or not the GPS receiver 150 can implement positioning (that is, whether or not the GPS receiver 150 can track at least three GPS satellites 110) on the basis of received GPS signals by referring to the caught-satellite information in the GPS information. In addition, the suspension controller 574 decides whether the radio controller 564 sets the reception circuit 524b in its on state or its off state. In the case where the GPS receiver 150 can implement positioning and the radio controller 564 sets the reception circuit 524b in its off state, the suspension controller 574 controls the GPS power supply 152 to start the power feed to the GPS receiver 150. Then, the GPS receiver 150 implements positioning at prescribed intervals (for example, intervals of 2 seconds). The suspension controller 574 measures the lapse of time from the moment at which the radio controller 564 switches the reception circuit 524b to its off state. At intervals of 2 seconds, the suspension controller 574 decides whether or not the measured lapse of time reaches the fourth prescribed time interval minus 2 seconds, that is, whether or not the remaining time interval to the next switching of the reception circuit 524b to its on state by the radio controller 564 is shorter than 2 seconds. In the case where the measured lapse of time does not reach the fourth prescribed time interval minus 2 seconds, that is, the remaining time interval is not shorter than 2 seconds, the GPS receiver 150 implements next positioning. Otherwise, the suspension controller 574 controls the GPS power supply 152 to suspend the power feed to the GPS receiver 150. The power feed to the GPS receiver 150 remains suspended while the reception circuit 524b continues to be in its on state. Thus, activation of the reception circuit 524b takes preference over activation of the GPS receiver 150. Upon the next switching of the reception circuit 524b to its off state by the radio controller 564, the suspension controller 574 controls the GPS power supply 152 to start the power feed to the GPS receiver 150. Consequently, the GPS receiver 150 restarts to implement positioning.

In the position detecting apparatus 520, the reception circuit 524b and the GPS receiver 150 tend to interfere with each other. Since the suspension controller 574 controls the GPS power supply 152 to continuously suspend the power feed to the GPS receiver 150 while the reception circuit 524b remains in its on state, the interference between the reception circuit 524b and the GPS receiver 150 can be reduced.

As shown in FIG. 11(c), in the case where the suspension controller 574 decides that the GPS receiver 150 can not implement positioning on the basis of received GPS signals, when the lapse of time from the beginning of this condition reaches the first prescribed time interval, the suspension controller 574 controls the GPS power supply 152 to suspend the power feed to the GPS receiver 150 for a term equal in length to the desired suspension time interval notified by the suspension time decider 172.

The position detecting apparatus 520 can implement positioning through the use of GPS satellites 110 while reducing the interference between the reception circuit 524b and the GPS receiver 150.

What is claimed is:

1. A position detecting apparatus comprising:
a GPS receiver configured to catch one or more of GPS satellites and track one or more of the GPS satellites while receiving a GPS signal or GPS signals from one or more of the GPS satellites, and implement positioning on the basis of received GPS signals from tracked GPS satellites, wherein a GPS satellite caught by the GPS receiver is a GPS satellite corresponding to a received GPS signal which has a level equal to or greater than a prescribed threshold value but from which information effective for positioning can not be derived, and wherein a GPS satellite tracked by the GPS receiver is a GPS satellite corresponding to a received GPS signal from which information effective for positioning can be derived;
a GPS power supply configured to controllably feed power to the GPS receiver;
a suspension time decider configured to decide a suspension time in accordance with the number of a GPS satellite or satellites caught by the GPS receiver in a manner such that the decided suspension time is varied depending on the number of a GPS satellite or satellites caught by the GPS receiver, and determine whether or not the lapse of time during which the GPS receiver continues not tracking at least three GPS satellites reaches a prescribed time; and
a suspension controller configured to control the GPS power supply to suspend the power feed to the GPS receiver during a term equal in length to the suspension time decided by the suspension time decider in cases where the suspension time decider determines that the lapse of time reaches the prescribed time;
wherein the suspension time decider decreases the decided suspension time in accordance with an increase in an average value of the number of a GPS satellite or satellites caught by the GPS receiver while the GPS receiver continues not tracking at least three GPS satellites.

2. A position detecting apparatus as recited in claim 1, further comprising a radio communication section including a reception circuit and configured to implement radio communications with an external apparatus, and a radio controller configured to switch the reception circuit between an on state and an off state, wherein the suspension time decider is configured to decide whether or not the GPS receiver is in conditions where the GPS receiver can implement positioning on the basis of received GPS signals, and the suspension controller is configured to control the GPS power supply to suspend the power feed to the GPS receiver while the radio controller holds the reception circuit in the on state in cases where the suspension time decider decides that the GPS receiver is in the conditions where the GPS receiver can implement positioning.

3. A method of detecting a position through the use of a position detecting apparatus including a GPS receiver and a GPS power supply, the GPS receiver being configured to catch one or more of GPS satellites and track one or more of the GPS satellites while receiving a GPS signal or GPS signals from one or more of the GPS satellites, and implement positioning on the basis of received GPS signals from tracked GPS satellites, the GPS power supply being configured to controllably feed power to the GPS receiver, wherein a GPS satellite caught by the GPS receiver is a GPS satellite corresponding to a received GPS signal which has a level equal to or greater than a prescribed threshold value but from which information effective for positioning can not be derived, and wherein a GPS satellite tracked by the GPS receiver is a GPS satellite corresponding to a received GPS signal from which information effective for positioning can be derived, the method comprising the steps of:
- deciding a suspension time in accordance with the number of a GPS satellite or satellites caught by the GPS receiver in a manner such that the decided suspension time is varied depending on the number of a GPS satellite or satellites caught by the GPS receiver;
- determining whether or not the lapse of time during which the GPS receiver continues not tracking at least three GPS satellites reaches a prescribed time; and
- controlling the GPS power supply to suspend the power feed to the GPS receiver during a term equal in length to the decided suspension time in cases where it is determined that the lapse of time reaches the prescribed time;
- wherein the decided suspension time is decreased in accordance with an increase in an average value of the number of a GPS satellite or satellites caught by the GPS receiver while the GPS receiver continues not tracking at least three GPS satellites.

* * * * *